US012619581B1

(12) United States Patent (10) Patent No.: US 12,619,581 B1
KG et al. (45) Date of Patent: May 5, 2026

(54) RESOURCE OPTIMIZATION IN A MULTI-SITE REPLICATION ENVIRONMENT

(71) Applicant: International Business Machines Corporation, Armonk, NY (US)

(72) Inventors: Karrthik KG, Kodaikanal (IN); Venkateswara Rao Puvvada, Inkollu (IN); Ashish Pandey, Pune (IN); Saket Kumar, Bettiah (IN)

(73) Assignee: International Business Machines Corporation, Armonk, NY (US)

( * ) Notice: Subject to any disclaimer, the term of this patent is extended or adjusted under 35 U.S.C. 154(b) by 11 days.

(21) Appl. No.: 18/973,321

(22) Filed: Dec. 9, 2024

(51) Int. Cl.
*G06F 16/178* (2019.01)

(52) U.S. Cl.
CPC ................................. *G06F 16/178* (2019.01)

(58) Field of Classification Search
CPC .............. G06F 11/1464; G06F 16/164; G06F 16/1824; G06F 9/542; G06F 9/546; G06F 9/547; G06F 11/1451; G06F 11/1469; G06F 11/2056; G06F 2201/84
USPC ......................................... 714/4.11; 707/626
See application file for complete search history.

(56) References Cited

U.S. PATENT DOCUMENTS

| | | | | | |
|---|---|---|---|---|---|
| 8,655,848 | B1 * | 2/2014 | Leverett | ................ | G06F 16/178 |
| | | | | | 709/201 |
| 9,842,117 | B1 * | 12/2017 | Zhou | .................... | G06F 16/128 |
| 11,250,024 | B2 | 2/2022 | Marsden | | |
| 11,263,091 | B2 | 3/2022 | Puvvada et al. | | |
| 11,507,600 | B2 * | 11/2022 | Vijayan | ................. | G06F 16/275 |
| 11,953,999 | B2 | 4/2024 | Kumar et al. | | |
| 11,954,073 | B2 | 4/2024 | Puvvada et al. | | |
| 12,045,252 | B2 * | 7/2024 | Sonner | ................ | G06F 11/2094 |
| 2021/0255933 | A1 * | 8/2021 | Puvvada | ............. | G06F 11/1469 |
| 2023/0119364 | A1 * | 4/2023 | Wang | .................. | G06F 11/0757 |
| | | | | | 707/626 |
| 2023/0297548 | A1 | 9/2023 | Puvvada et al. | | |

OTHER PUBLICATIONS

AFM resync version 2, IBM Storage Scale 5.2.1, Retrieved from: https://www.ibm.com/docs/en/storage-scale/5.2.1?topic=features-afm-resync-version-2, Aug. 16, 2023, 4 pages.
IPCOM000275069d, Migrating Data Across Different Storage Vendors with Minimal Impact on Applications, IP.com, Sep. 19, 2024, 7 pages.
Multi-Region Replication for Disaster Recovery, Retrieved from: https://docs.gigaspaces.com/latest/dev-java/multi-site-replication-overview.html, Mar. 14, 2024, 11 pages.

* cited by examiner

*Primary Examiner* — Cam Linh T Nguyen
(74) *Attorney, Agent, or Firm* — Yee & Associates, P.C.

(57) ABSTRACT

Managing multi-site replication is provided. An input/output operation on a file of a local filesystem is captured to form a captured input/output file operation. The captured input/output file operation is enqueued on a single replication queue located in memory. Replication of the captured input/output file operation is performed to each of a plurality of target remote sites based on the single replication queue and a plurality of replication status inode bits included in an inode of the local filesystem.

20 Claims, 6 Drawing Sheets

COMPUTING ENVIRONMENT
100

MULTI-SITE REPLICATION MANAGEMENT SYSTEM 201

MULTI-SITE REPLICATION
MANAGEMENT PROCESS
300

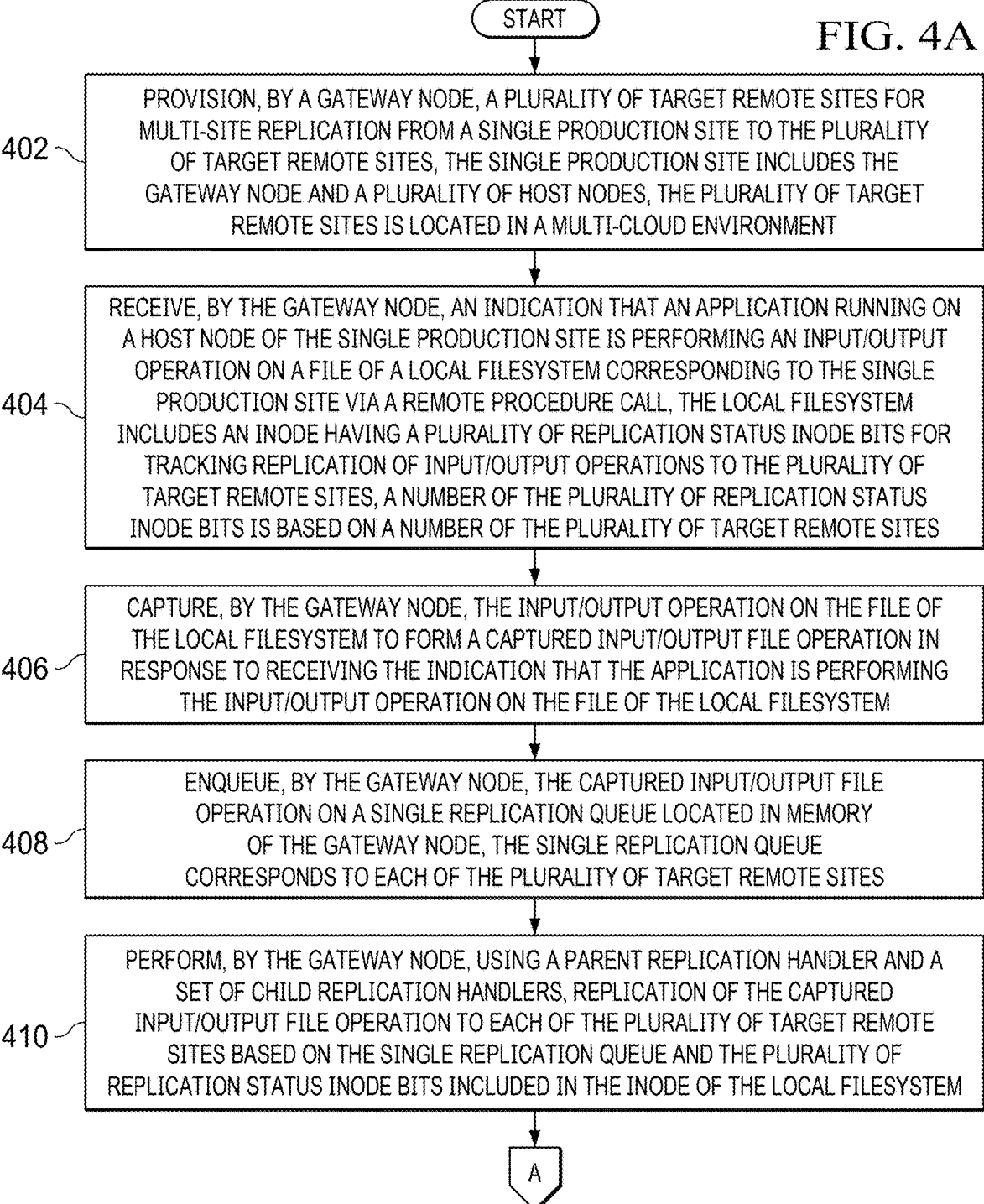

START

FIG. 4A

402 — PROVISION, BY A GATEWAY NODE, A PLURALITY OF TARGET REMOTE SITES FOR MULTI-SITE REPLICATION FROM A SINGLE PRODUCTION SITE TO THE PLURALITY OF TARGET REMOTE SITES, THE SINGLE PRODUCTION SITE INCLUDES THE GATEWAY NODE AND A PLURALITY OF HOST NODES, THE PLURALITY OF TARGET REMOTE SITES IS LOCATED IN A MULTI-CLOUD ENVIRONMENT

404 — RECEIVE, BY THE GATEWAY NODE, AN INDICATION THAT AN APPLICATION RUNNING ON A HOST NODE OF THE SINGLE PRODUCTION SITE IS PERFORMING AN INPUT/OUTPUT OPERATION ON A FILE OF A LOCAL FILESYSTEM CORRESPONDING TO THE SINGLE PRODUCTION SITE VIA A REMOTE PROCEDURE CALL, THE LOCAL FILESYSTEM INCLUDES AN INODE HAVING A PLURALITY OF REPLICATION STATUS INODE BITS FOR TRACKING REPLICATION OF INPUT/OUTPUT OPERATIONS TO THE PLURALITY OF TARGET REMOTE SITES, A NUMBER OF THE PLURALITY OF REPLICATION STATUS INODE BITS IS BASED ON A NUMBER OF THE PLURALITY OF TARGET REMOTE SITES

406 — CAPTURE, BY THE GATEWAY NODE, THE INPUT/OUTPUT OPERATION ON THE FILE OF THE LOCAL FILESYSTEM TO FORM A CAPTURED INPUT/OUTPUT FILE OPERATION IN RESPONSE TO RECEIVING THE INDICATION THAT THE APPLICATION IS PERFORMING THE INPUT/OUTPUT OPERATION ON THE FILE OF THE LOCAL FILESYSTEM

408 — ENQUEUE, BY THE GATEWAY NODE, THE CAPTURED INPUT/OUTPUT FILE OPERATION ON A SINGLE REPLICATION QUEUE LOCATED IN MEMORY OF THE GATEWAY NODE, THE SINGLE REPLICATION QUEUE CORRESPONDS TO EACH OF THE PLURALITY OF TARGET REMOTE SITES

410 — PERFORM, BY THE GATEWAY NODE, USING A PARENT REPLICATION HANDLER AND A SET OF CHILD REPLICATION HANDLERS, REPLICATION OF THE CAPTURED INPUT/OUTPUT FILE OPERATION TO EACH OF THE PLURALITY OF TARGET REMOTE SITES BASED ON THE SINGLE REPLICATION QUEUE AND THE PLURALITY OF REPLICATION STATUS INODE BITS INCLUDED IN THE INODE OF THE LOCAL FILESYSTEM

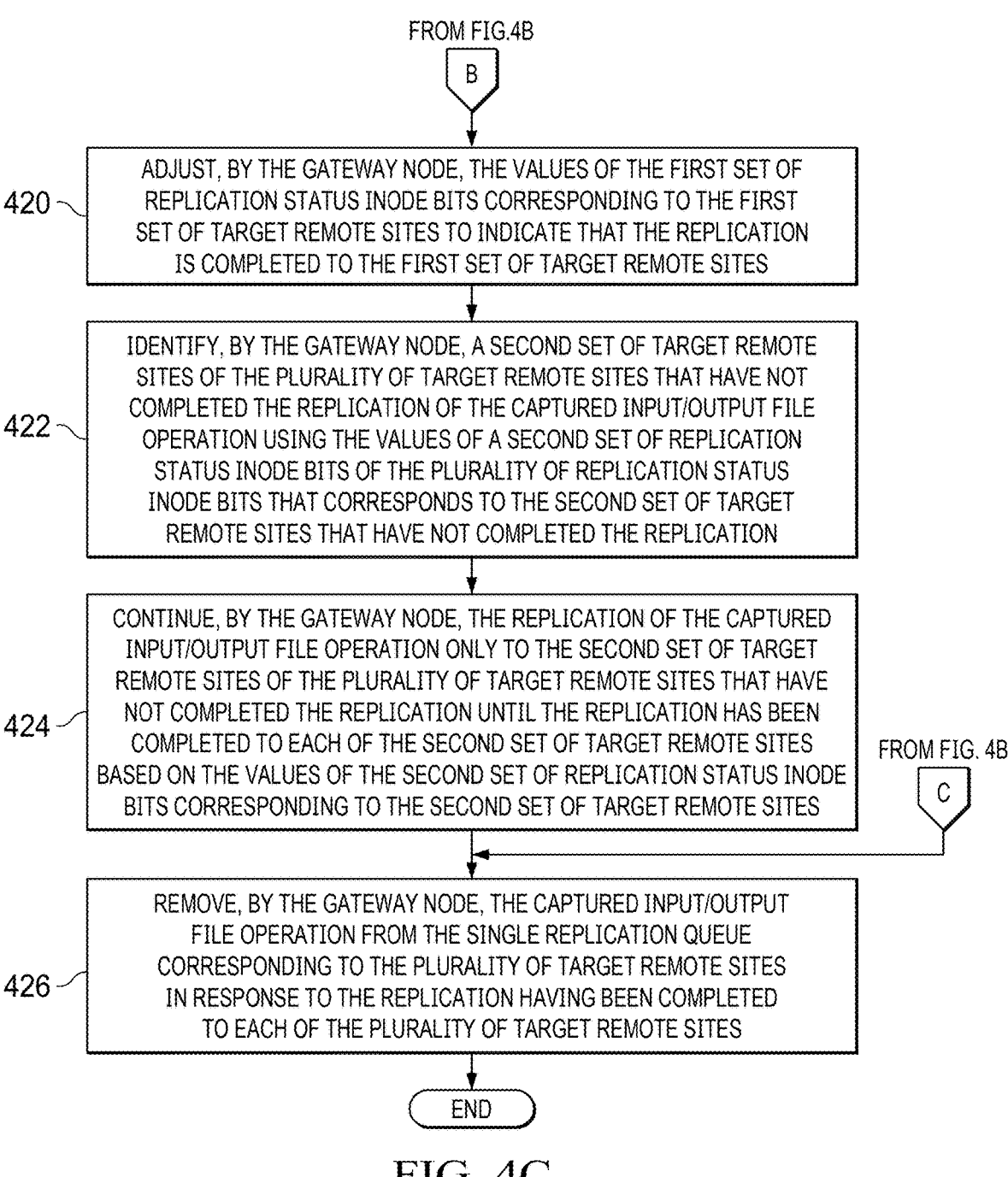

FROM FIG.4B

B

420 — ADJUST, BY THE GATEWAY NODE, THE VALUES OF THE FIRST SET OF REPLICATION STATUS INODE BITS CORRESPONDING TO THE FIRST SET OF TARGET REMOTE SITES TO INDICATE THAT THE REPLICATION IS COMPLETED TO THE FIRST SET OF TARGET REMOTE SITES

422 — IDENTIFY, BY THE GATEWAY NODE, A SECOND SET OF TARGET REMOTE SITES OF THE PLURALITY OF TARGET REMOTE SITES THAT HAVE NOT COMPLETED THE REPLICATION OF THE CAPTURED INPUT/OUTPUT FILE OPERATION USING THE VALUES OF A SECOND SET OF REPLICATION STATUS INODE BITS OF THE PLURALITY OF REPLICATION STATUS INODE BITS THAT CORRESPONDS TO THE SECOND SET OF TARGET REMOTE SITES THAT HAVE NOT COMPLETED THE REPLICATION

424 — CONTINUE, BY THE GATEWAY NODE, THE REPLICATION OF THE CAPTURED INPUT/OUTPUT FILE OPERATION ONLY TO THE SECOND SET OF TARGET REMOTE SITES OF THE PLURALITY OF TARGET REMOTE SITES THAT HAVE NOT COMPLETED THE REPLICATION UNTIL THE REPLICATION HAS BEEN COMPLETED TO EACH OF THE SECOND SET OF TARGET REMOTE SITES BASED ON THE VALUES OF THE SECOND SET OF REPLICATION STATUS INODE BITS CORRESPONDING TO THE SECOND SET OF TARGET REMOTE SITES

FROM FIG. 4B

C

426 — REMOVE, BY THE GATEWAY NODE, THE CAPTURED INPUT/OUTPUT FILE OPERATION FROM THE SINGLE REPLICATION QUEUE CORRESPONDING TO THE PLURALITY OF TARGET REMOTE SITES IN RESPONSE TO THE REPLICATION HAVING BEEN COMPLETED TO EACH OF THE PLURALITY OF TARGET REMOTE SITES

END

FIG. 4C

RESOURCE OPTIMIZATION IN A
MULTI-SITE REPLICATION ENVIRONMENT

BACKGROUND

The disclosure relates generally to file operation replication and more specifically to multi-site file operation replication.

Replication involves sharing information to ensure consistency between multiple redundant resources to improve, for example, reliability, fault-tolerance, accessibility, and the like. File-based replication conducts data replication at the logical level (e.g., individual data files). Often, it is desirable to save multiple copies of files to protect the files from inadvertent deletion, hardware failure, power failure, natural disaster, and the like which may render the files temporarily or permanently unavailable. The copies of the files may be stored geographically remote from each other (e.g., replicating files to backup sites located in different geographic regions) with the files transferred via one or more networks. Replication may be performed on a continuous basis in real time as changes occur, on a predefined periodic basis (e.g., hourly, daily, weekly, or the like), or on demand.

SUMMARY

According to one illustrative embodiment, a method is provided. The method captures an input/output operation on a file of a local filesystem to form a captured input/output file operation. The method enqueues the captured input/output file operation on a single replication queue located in memory. The method performs replication of the captured input/output file operation to each of a plurality of target remote sites based on the single replication queue and a plurality of replication status inode bits included in an inode of the local filesystem. According to other illustrative embodiments, a computer system and computer program product are provided.

BRIEF DESCRIPTION OF THE DRAWINGS

FIGS. 4A-4C are a flowchart illustrating a process for managing multi-site replication in accordance with an illustrative embodiment.

DETAILED DESCRIPTION

Figure 1:
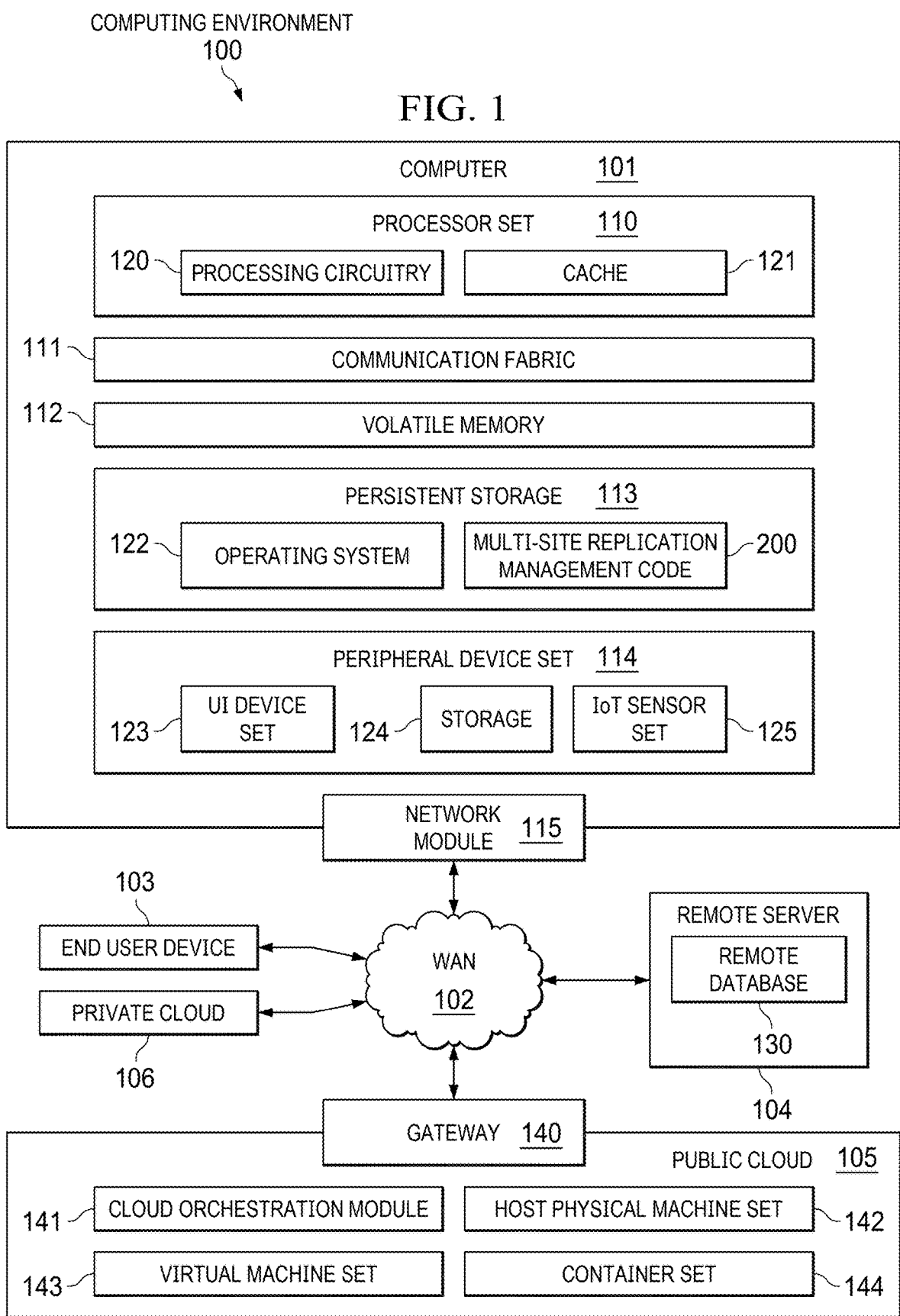
FIG. 1 is a pictorial representation of a computing environment in which illustrative embodiments may be implemented.

A method captures an input/output operation on a file of a local filesystem to form a captured input/output file operation. The method enqueues the captured input/output file operation on a single replication queue located in memory. The method performs replication of the captured input/output file operation to each of a plurality of target remote sites based on the single replication queue and a plurality of replication status inode bits included in an inode of the local filesystem. As a result, illustrative embodiments provide a technical effect of decreasing resource utilization and increasing system performance by using only one replication queue to replicate input/output file operations to each of a plurality of target remote sites.

Also, the method tracks a status of the replication of the captured input/output file operation to each of the plurality of target remote sites using values of the plurality of replication status inode bits included in the inode of the local filesystem. The method determines whether the replication of the captured input/output file operation has been completed to one or more of the plurality of target remote sites based on tracking the status of the replication to each of the plurality of target remote sites using the values of the plurality of replication status inode bits. As a result, illustrative embodiments provide a technical effect of using values of replication status inode bits to track replication status of input/output file operations to each of a plurality of target remote sites and determine whether the replication has been completed or not to each respective target remote site.

In addition, in response to determining that the replication of the captured input/output file operation has been completed to one or more of the plurality of target remote sites based on tracking the status of the replication to each of the plurality of target remote sites using the values of the plurality of replication status inode bits, the method further determines whether the replication of the captured input/output file operation has been completed to each of the plurality of target remote sites based on tracking the status of the replication to each of the plurality of target remote sites using the values of the plurality of replication status inode bits. In response to determining that the replication of the captured input/output file operation has not been completed to each of the plurality of target remote sites, the method identifies a first set of target remote sites of the plurality of target remote sites that have completed the replication of the captured input/output file operation using the values of a first set of replication status inode bits of the plurality of replication status inode bits that corresponds to the first set of target remote sites that have completed the replication. As a result, illustrative embodiments provide a technical effect of using values of replication status inode bits to determine whether replication has been completed to each of the plurality of target remote sites and identify a first set of target remote sites of the plurality of target remote sites that have completed the replication when the replication has not been completed to all of the target remote sites.

Further, the method adjusts the values of the first set of replication status inode bits corresponding to the first set of target remote sites to indicate that the replication is completed to the first set of target remote sites. As a result, illustrative embodiments provide a technical effect of only adjusting the replication status inode bit values that correspond to the first set of target remote sites to indicate that replication has completed to only those particular target remote sites.

Furthermore, the method identifies a second set of target remote sites of the plurality of target remote sites that have not completed the replication of the captured input/output file operation using the values of a second set of replication status inode bits of the plurality of replication status inode bits that corresponds to the second set of target remote sites that have not completed the replication. The method continues the replication of the captured input/output file operation only to the second set of target remote sites of the plurality of target remote sites that have not completed the replication until the replication has been completed to each of the second set of target remote sites based on the values of the second set of replication status inode bits corresponding to the second set of target remote sites. As a result, illustrative embodiments provide a technical effect of using values of replication status inode bits to identify a second set of target remote sites that have not completed input/output file operation replication and continuing replication until completed on each of the second set of target remote sites.

Moreover, the method removes the captured input/output file operation from the single replication queue corresponding to the plurality of target remote sites in response to the replication having been completed to each of the plurality of target remote sites. As a result, illustrative embodiments provide a technical effect of decreasing memory usage by removing input/output file operation entries from the replication queue when replication has been completed to all of the target remote sites.

The method also provisions the plurality of target remote sites for multi-site replication from a single production site to the plurality of target remote sites. The single production site includes a gateway node and a plurality of host nodes. The gateway node performs the replication of the captured input/output file operation to the plurality of target remote sites using the single replication queue. The plurality of target remote sites is located in a multi-cloud environment. As a result, illustrative embodiments provide a technical effect of providing multi-site replication to a plurality of target remote sites in a multi-cloud environment from a single production site that includes a gateway node that performs input/output file operation replication to the plurality of target remote sites using a single replication queue to decrease resource utilization and increase system performance.

In addition, the method receives an indication that an application running on a host node of a single production site is performing the input/output operation on the file of the local filesystem corresponding to the single production site. The local filesystem includes the inode having the plurality of replication status inode bits for tracking the replication of input/output operations to the plurality of target remote sites. A number of the plurality of replication status inode bits is based on a number of the plurality of target remote sites. As a result, illustrative embodiments provide a technical effect of matching the number of replication status inode bits to the number of target remote sites for easy identification of the target remote sites and tracking replication to each of the target remote sites.

A computer system comprises a processor set, one or more computer-readable storage media, and program instructions stored on the one or more computer-readable storage media to cause the processor set to perform operations. The computer system captures an input/output operation on a file of a local filesystem to form a captured input/output file operation. The computer system enqueues the captured input/output file operation on a single replication queue located in memory. The computer system performs replication of the captured input/output file operation to each of a plurality of target remote sites based on the single replication queue and a plurality of replication status inode bits included in an inode of the local filesystem. As a result, illustrative embodiments provide a technical effect of decreasing resource utilization and increasing system performance by using only one replication queue to replicate input/output file operations to each of a plurality of target remote sites.

Also, the computer system tracks a status of the replication of the captured input/output file operation to each of the plurality of target remote sites using values of the plurality of replication status inode bits included in the inode of the local filesystem. The computer system determines whether the replication of the captured input/output file operation has been completed to one or more of the plurality of target remote sites based on tracking the status of the replication to each of the plurality of target remote sites using the values of the plurality of replication status inode bits. As a result, illustrative embodiments provide a technical effect of using values of replication status inode bits to track replication status of input/output file operations to each of a plurality of target remote sites and determine whether the replication has been completed or not to each respective target remote site.

In addition, in response to determining that the replication of the captured input/output file operation has been completed to one or more of the plurality of target remote sites based on tracking the status of the replication to each of the plurality of target remote sites using the values of the plurality of replication status inode bits, the computer system further determines whether the replication of the captured input/output file operation has been completed to each of the plurality of target remote sites based on tracking the status of the replication to each of the plurality of target remote sites using the values of the plurality of replication status inode bits. In response to determining that the replication of the captured input/output file operation has not been completed to each of the plurality of target remote sites, the computer system identifies a first set of target remote sites of the plurality of target remote sites that have completed the replication of the captured input/output file operation using the values of a first set of replication status inode bits of the plurality of replication status inode bits that corresponds to the first set of target remote sites that have completed the replication. As a result, illustrative embodiments provide a technical effect of using values of replication status inode bits to determine whether replication has been completed to each of the plurality of target remote sites and identify a first set of target remote sites of the plurality of target remote sites that have completed the replication when the replication has not been completed to all of the target remote sites.

Further, the computer system adjusts the values of the first set of replication status inode bits corresponding to the first set of target remote sites to indicate that the replication is completed to the first set of target remote sites. As a result, illustrative embodiments provide a technical effect of only adjusting the replication status inode bit values that correspond to the first set of target remote sites to indicate that replication has completed to only those particular target remote sites.

Furthermore, the computer system identifies a second set of target remote sites of the plurality of target remote sites that have not completed the replication of the captured input/output file operation using the values of a second set of replication status inode bits of the plurality of replication status inode bits that corresponds to the second set of target remote sites that have not completed the replication. The computer system continues the replication of the captured input/output file operation only to the second set of target remote sites of the plurality of target remote sites that have not completed the replication until the replication has been completed to each of the second set of target remote sites based on the values of the second set of replication status inode bits corresponding to the second set of target remote sites. As a result, illustrative embodiments provide a technical effect of using values of replication status inode bits to identify a second set of target remote sites that have not completed input/output file operation replication and continuing replication until completed on each of the second set of target remote sites.

A computer program product comprises one or more computer-readable storage media and program instructions stored on the one or more computer-readable storage media to perform operations. The computer program product captures an input/output operation on a file of a local filesystem to form a captured input/output file operation. The computer program product enqueues the captured input/output file operation on a single replication queue located in memory. The computer program product performs replication of the captured input/output file operation to each of a plurality of target remote sites based on the single replication queue and a plurality of replication status inode bits included in an inode of the local filesystem. As a result, illustrative embodiments provide a technical effect of decreasing resource utilization and increasing system performance by using only one replication queue to replicate input/output file operations to each of a plurality of target remote sites.

Also, the computer program product tracks a status of the replication of the captured input/output file operation to each of the plurality of target remote sites using values of the plurality of replication status inode bits included in the inode of the local filesystem. The computer program product determines whether the replication of the captured input/output file operation has been completed to one or more of the plurality of target remote sites based on tracking the status of the replication to each of the plurality of target remote sites using the values of the plurality of replication status inode bits. As a result, illustrative embodiments provide a technical effect of using values of replication status inode bits to track replication status of input/output file operations to each of a plurality of target remote sites and determine whether the replication has been completed or not to each respective target remote site.

In addition, in response to determining that the replication of the captured input/output file operation has been completed to one or more of the plurality of target remote sites based on tracking the status of the replication to each of the plurality of target remote sites using the values of the plurality of replication status inode bits, the computer program product further determines whether the replication of the captured input/output file operation has been completed to each of the plurality of target remote sites based on tracking the status of the replication to each of the plurality of target remote sites using the values of the plurality of replication status inode bits. In response to determining that the replication of the captured input/output file operation has not been completed to each of the plurality of target remote sites, the computer program product identifies a first set of target remote sites of the plurality of target remote sites that have completed the replication of the captured input/output file operation using the values of a first set of replication status inode bits of the plurality of replication status inode bits that corresponds to the first set of target remote sites that have completed the replication. As a result, illustrative embodiments provide a technical effect of using values of replication status inode bits to determine whether replication has been completed to each of the plurality of target remote sites and identify a first set of target remote sites of the plurality of target remote sites that have completed the replication when the replication has not been completed to all of the target remote sites.

Further, the computer program product adjusts the values of the first set of replication status inode bits corresponding to the first set of target remote sites to indicate that the replication is completed to the first set of target remote sites. As a result, illustrative embodiments provide a technical effect of only adjusting the replication status inode bit values that correspond to the first set of target remote sites to indicate that replication has completed to only those particular target remote sites.

Furthermore, the computer program product identifies a second set of target remote sites of the plurality of target remote sites that have not completed the replication of the captured input/output file operation using the values of a second set of replication status inode bits of the plurality of replication status inode bits that corresponds to the second set of target remote sites that have not completed the replication. The computer program product continues the replication of the captured input/output file operation only to the second set of target remote sites of the plurality of target remote sites that have not completed the replication until the replication has been completed to each of the second set of target remote sites based on the values of the second set of replication status inode bits corresponding to the second set of target remote sites. As a result, illustrative embodiments provide a technical effect of using values of replication status inode bits to identify a second set of target remote sites that have not completed input/output file operation replication and continuing replication until completed on each of the second set of target remote sites.

Moreover, the computer program product removes the captured input/output file operation from the single replication queue corresponding to the plurality of target remote sites in response to the replication having been completed to each of the plurality of target remote sites. As a result, illustrative embodiments provide a technical effect of decreasing memory usage by removing input/output file operation entries from the replication queue when replication has been completed to all of the target remote sites.

The computer program product also provisions the plurality of target remote sites for multi-site replication from a single production site to the plurality of target remote sites. The single production site includes a gateway node and a plurality of host nodes. The gateway node performs the replication of the captured input/output file operation to the plurality of target remote sites using the single replication queue. The plurality of target remote sites is located in a multi-cloud environment. As a result, illustrative embodiments provide a technical effect of providing multi-site replication to a plurality of target remote sites in a multi-cloud environment from a single production site that includes a gateway node that performs input/output file operation replication to the plurality of target remote sites using a single replication queue to decrease resource utilization and increase system performance.

Various aspects of the present disclosure are described by narrative text, flowcharts, block diagrams of computer systems, and/or block diagrams of the machine logic included in computer program product (CPP) embodiments. With respect to any flowcharts, depending upon the technology involved, the operations can be performed in a different order than what is shown in a given flowchart. For example, again depending upon the technology involved, two operations shown in successive flowchart blocks may be performed in reverse order, as a single integrated step, concurrently, or in a manner at least partially overlapping in time.

A CPP embodiment is a term used in the present disclosure to describe any set of one, or more, storage media (also called "mediums") collectively included in a set of one, or more, storage devices that collectively include machine readable code corresponding to instructions and/or data for performing computer operations specified in a given CPP claim. A "storage device" is any tangible device that can retain and store instructions for use by a computer processor.

Without limitation, the computer-readable storage medium may be an electronic storage medium, a magnetic storage medium, an optical storage medium, an electromagnetic storage medium, a semiconductor storage medium, a mechanical storage medium, or any suitable combination of the foregoing. Some known types of storage devices that include these mediums include: diskette, hard disk, random access memory (RAM), read-only memory (ROM), erasable programmable read-only memory (EPROM or Flash memory), static random access memory (SRAM), compact disc read-only memory (CD-ROM), digital versatile disk (DVD), memory stick, floppy disk, mechanically encoded device (such as punch cards or pits/lands formed in a major surface of a disc), or any suitable combination of the foregoing. A computer-readable storage medium, as that term is used in the present disclosure, is not to be construed as storage in the form of transitory signals per se, such as radio waves or other freely propagating electromagnetic waves, electromagnetic waves propagating through a waveguide, light pulses passing through a fiber optic cable, electrical signals communicated through a wire, and/or other transmission media. As will be understood by those of skill in the art, data is typically moved at some occasional points in time during normal operations of a storage device, such as during access, de-fragmentation or garbage collection, but this does not render the storage device as transitory because the data is not transitory while it is stored.

Figure 2:
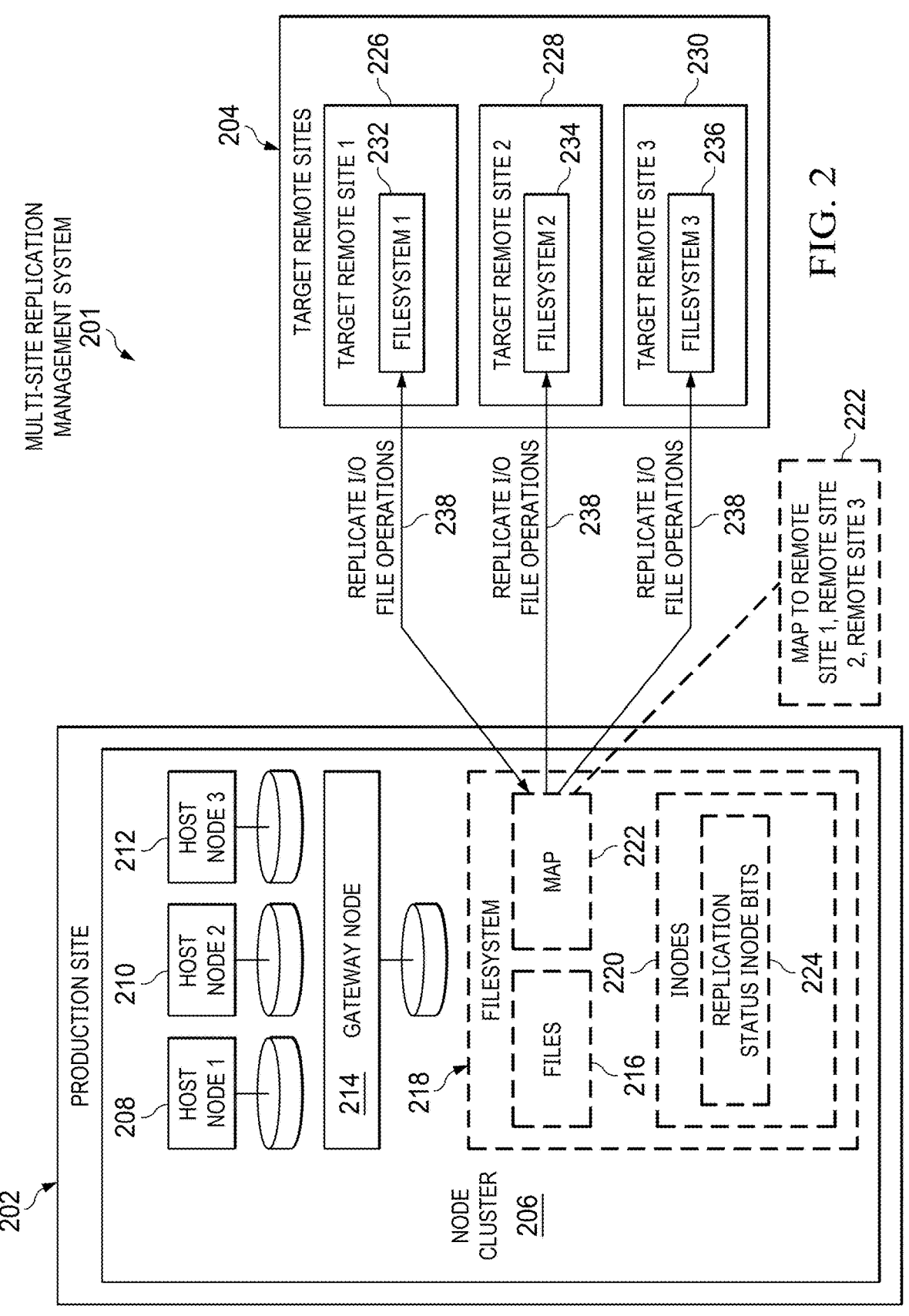
FIG. 2 is a diagram illustrating an example of a multi-site replication management system in accordance with an illustrative embodiment.

With reference now to the figures, and in particular, with reference to FIG. 1 and FIG. 2, diagrams of data processing environments are provided in which illustrative embodiments may be implemented. It should be appreciated that FIG. 1 and FIG. 2 are only meant as examples and are not intended to assert or imply any limitation with regard to the environments in which different embodiments may be implemented. Many modifications to the depicted environments may be made.

FIG. 1 shows a pictorial representation of a computing environment in which illustrative embodiments may be implemented. Computing environment 100 contains an example of an environment for the execution of at least some of the computer code involved in performing the inventive methods of illustrative embodiments, such as multi-site replication management code 200.

For example, multi-site replication management code 200 enables multi-site replication from a single production site to a plurality of target remote sites. Multi-site replication management code 200 captures input/output file operations (e.g., create file operation, rename file operation, write file operation, and the like) performed by applications on files of a local filesystem in the single production site. Multi-site replication management code 200 maintains a single replication queue listing the input/output file operations for the multi-site replication. Multi-site replication management code 200 manages replication of the input/output file operations to the plurality of target remote sites for backup purposes using the single replication queue and a number of replication status index node (inode) bits. The number of replication status inode bits needed for input/output file operation replication varies depending on the total number of target remote sites.

In addition, multi-site replication management code 200 can utilize a combination of replication status inode bits to represent a replication state of each respective target remote site (e.g., whether replication is pending or not to each particular target remote site). Multi-site replication management code 200 use these same replication status inode bits to track success or failure of file operation replication to each respective target remote site in the plurality of target remote sites. In case of replication failure to one or more target remote sites, multi-site replication management code 200 utilizes the replication status inode bits to identify those target remote sites where replication failed and continue to perform replication to only those target remote sites until replication is completed. Moreover, multi-site replication management code 200 may utilize a parent replication handler and a set of child replication handlers to accomplish this multi-site replication.

As a result, multi-site replication management code 200 provides an ability to replicate an input/output file operation to a plurality of target remote sites in a multi-cloud replication environment with little change to existing infrastructure. Further, multi-site replication management code 200 minimizes memory usage for input/output file operation replication to the plurality of target remote sites from a filesystem of the production site by utilizing only one replication queue for the multi-site replication. Therefore, multi-site replication management code 200 increases system performance by decreasing resource utilization. Furthermore, multi-site replication management code 200 dynamically supports the adding and removing of target remote sites by adjusting bit values in the replication status inode bits accordingly.

In addition to multi-site replication management code 200, computing environment 100 includes, for example, computer 101, wide area network (WAN) 102, end user device (EUD) 103, remote server 104, public cloud 105, and private cloud 106. In this embodiment, computer 101 includes processor set 110 (including processing circuitry 120 and cache 121), communication fabric 111, volatile memory 112, persistent storage 113 (including operating system 122 and multi-site replication management code 200, as identified above), peripheral device set 114 (including user interface (UI) device set 123, storage 124, and Internet of Things (IoT) sensor set 125), and network module 115. Remote server 104 includes remote database 130. Public cloud 105 includes gateway 140, cloud orchestration module 141, host physical machine set 142, virtual machine set 143, and container set 144.

Computer 101 may be, for example, a gateway node at the production site. Computer 101 may take the form of a mainframe computer, quantum computer, desktop computer, laptop computer, tablet computer, or any other form of computer now known or to be developed in the future that is capable of, for example, running a program, accessing a network, and querying a database, such as remote database 130. As is well understood in the art of computer technology, and depending upon the technology, performance of a computer-implemented method may be distributed among multiple computers and/or between multiple locations. On the other hand, in this presentation of computing environment 100, detailed discussion is focused on a single computer, specifically computer 101, to keep the presentation as simple as possible. Computer 101 may be located in a cloud, even though it is not shown in a cloud in FIG. 1. On the other hand, computer 101 is not required to be in a cloud except to any extent as may be affirmatively indicated.

Processor set 110 includes one, or more, computer processors of any type now known or to be developed in the future. Processing circuitry 120 may be distributed over multiple packages, for example, multiple, coordinated integrated circuit chips. Processing circuitry 120 may implement multiple processor threads and/or multiple processor cores. Cache 121 is memory that is located in the processor chip package(s) and is typically used for data or code that should be available for rapid access by the threads or cores running on processor set 110. Cache memories are typically organized into multiple levels depending upon relative proximity to the processing circuitry. Alternatively, some, or all, of the cache for the processor set may be located "off chip." In some computing environments, processor set 110 may be designed for working with qubits and performing quantum computing.

Computer-readable program instructions are typically loaded onto computer 101 to cause a series of operational steps to be performed by processor set 110 of computer 101 and thereby effect a computer-implemented method, such that the instructions thus executed will instantiate the methods specified in flowcharts and/or narrative descriptions of computer-implemented methods included in this document (collectively referred to as "the inventive methods"). These computer-readable program instructions are stored in various types of computer-readable storage media, such as cache 121 and the other storage media discussed below. The program instructions, and associated data, are accessed by processor set 110 to control and direct performance of the inventive methods. In computing environment 100, at least some of the instructions for performing the inventive methods of illustrative embodiments may be stored in multi-site replication management code 200 in persistent storage 113.

Communication fabric 111 is the signal conduction path that allows the various components of computer 101 to communicate with each other. Typically, this fabric is made of switches and electrically conductive paths, such as the switches and electrically conductive paths that make up buses, bridges, physical input/output ports, and the like. Other types of signal communication paths may be used, such as fiber optic communication paths and/or wireless communication paths.

Volatile memory 112 is any type of volatile memory now known or to be developed in the future. Examples include dynamic type random access memory (RAM) or static type RAM. Typically, volatile memory 112 is characterized by random access, but this is not required unless affirmatively indicated. In computer 101, the volatile memory 112 is located in a single package and is internal to computer 101, but, alternatively or additionally, the volatile memory may be distributed over multiple packages and/or located externally with respect to computer 101.

Persistent storage 113 is any form of non-volatile storage for computers that is now known or to be developed in the future. The non-volatility of this storage means that the stored data is maintained regardless of whether power is being supplied to computer 101 and/or directly to persistent storage 113. Persistent storage 113 may be a read only memory (ROM), but typically at least a portion of the persistent storage allows writing of data, deletion of data, and re-writing of data. Some familiar forms of persistent storage include magnetic disks and solid-state storage devices. Operating system 122 may take several forms, such as various known proprietary operating systems or open-source portable operating system interface-type operating systems that employ a kernel.

Peripheral device set 114 includes the set of peripheral devices of computer 101. Data communication connections between the peripheral devices and the other components of computer 101 may be implemented in various ways, such as Bluetooth connections, Near-Field Communication (NFC) connections, connections made by cables (such as universal serial bus (USB) type cables), insertion-type connections (for example, secure digital (SD) card), connections made through local area communication networks, and even connections made through wide area networks such as the internet. In various embodiments, UI device set 123 may include components such as a display screen, speaker, microphone, wearable devices (such as smart glasses and smart watches), keyboard, mouse, printer, touchpad, and haptic devices.

Storage 124 is external storage, such as an external hard drive, or insertable storage, such as an SD card. Storage 124 may be persistent and/or volatile. In some embodiments, storage 124 may take the form of a quantum computing storage device for storing data in the form of qubits. In embodiments where computer 101 is required to have a large amount of storage (e.g., where computer 101 locally stores and manages a large database) then this storage may be provided by peripheral storage devices designed for storing very large amounts of data, such as a storage area network (SAN) that is shared by multiple, geographically distributed computers.

IoT sensor set 125 is made up of sensors that can be used in Internet of Things applications. For example, one sensor may be a thermometer and another sensor may be a motion detector.

Network module 115 is the collection of computer software, hardware, and firmware that allows computer 101 to communicate with other computers through WAN 102. Network module 115 may include hardware, such as modems or Wi-Fi signal transceivers, software for packetizing and/or de-packetizing data for communication network transmission, and/or web browser software for communicating data over the internet. In some embodiments, network control functions and network forwarding functions of network module 115 are performed on the same physical hardware device. In other embodiments (e.g., embodiments that utilize software-defined networking (SDN)), the control functions and the forwarding functions of network module 115 are performed on physically separate devices, such that the control functions manage several different network hardware devices. Computer-readable program instructions for performing the inventive methods can typically be downloaded to computer 101 from an external computer or external storage device through a network adapter card or network interface included in network module 115.

WAN 102 is any wide area network (e.g., the internet) capable of communicating computer data over non-local distances by any technology for communicating computer data, now known or to be developed in the future. In some embodiments, the WAN 102 may be replaced and/or supplemented by local area networks (LANs) designed to communicate data between devices located in a local area, such as a Wi-Fi network. The WAN and/or LANs typically include computer hardware such as copper transmission cables, optical transmission fibers, wireless transmission, routers, firewalls, switches, gateway computers, and edge servers.

EUD 103 is any computer system that is used and controlled by an end user (e.g., a system administrator who utilizes the multi-site replication management services provided by computer 101), and may take any of the forms discussed above in connection with computer 101. EUD 103 typically receives helpful and useful data from the operations of computer 101. For example, in a hypothetical case where computer 101 is designed to provide a multi-site replication recommendation to the end user, this recommendation would typically be communicated from network module 115 of computer 101 through WAN 102 to EUD 103. In this way, EUD 103 can display, or otherwise present, the multi-site replication management recommendation to the end user. In some embodiments, EUD 103 may be a client device, such as a thin client, heavy client, mainframe computer, desktop computer, laptop computer, tablet computer, smart phone, and so on.

Remote server 104 is any computer system that serves at least some data and/or functionality to computer 101. Remote server 104 may be controlled and used by the same entity that operates computer 101. Remote server 104 represents the machine(s) that collect and store helpful and useful data for use by other computers, such as computer 101. For example, in a hypothetical case where computer 101 is designed and programmed to provide a multi-site replication management recommendation based on historical data, then this historical data may be provided to computer 101 from remote database 130 of remote server 104.

Public cloud 105 is any computer system available for use by multiple entities that provides on-demand availability of computer system resources and/or other computer capabilities, especially data storage (cloud storage) and computing power, without direct active management by the user. Cloud computing typically leverages sharing of resources to achieve coherence and economies of scale. The direct and active management of the computing resources of public cloud 105 is performed by the computer hardware and/or software of cloud orchestration module 141. The computing resources provided by public cloud 105 are typically implemented by virtual computing environments that run on various computers making up the computers of host physical machine set 142, which is the universe of physical computers in and/or available to public cloud 105. Host physical machine set 142 may represent, for example, one or more target remote sites for file replication and backup.

The virtual computing environments (VCEs) typically take the form of virtual machines from virtual machine set 143 and/or containers from container set 144. It is understood that these VCEs may be stored as images and may be transferred among and between the various physical machine hosts, either as images or after instantiation of the VCE. Cloud orchestration module 141 manages the transfer and storage of images, deploys new instantiations of VCEs and manages active instantiations of VCE deployments. Gateway 140 is the collection of computer software, hardware, and firmware that allows public cloud 105 to communicate through WAN 102.

Some further explanation of virtualized computing environments (VCEs) will now be provided. VCEs can be stored as "images." A new active instance of the VCE can be instantiated from the image. Two familiar types of VCEs are virtual machines and containers. A container is a VCE that uses operating-system-level virtualization. This refers to an operating system feature in which the kernel allows the existence of multiple isolated user-space instances, called containers. These isolated user-space instances typically behave as real computers from the point of view of programs running in them. A computer program running on an ordinary operating system can utilize all resources of that computer, such as connected devices, files and folders, network shares, CPU power, and quantifiable hardware capabilities. However, programs running inside a container can only use the contents of the container and devices assigned to the container, a feature which is known as containerization.

Private cloud 106 is similar to public cloud 105, except that the computing resources are only available for use by a single entity. While private cloud 106 is depicted as being in communication with WAN 102, in other embodiments a private cloud may be disconnected from the internet entirely and only accessible through a local/private network. A hybrid cloud is a composition of multiple clouds of different types (for example, private, community or public cloud types), often respectively implemented by different vendors. Each of the multiple clouds remains a separate and discrete entity, but the larger hybrid cloud architecture is bound together by standardized or proprietary technology that enables orchestration, management, and/or data/application portability between the multiple constituent clouds. In this embodiment, public cloud 105 and private cloud 106 are both part of a larger hybrid cloud.

Public cloud 105 and private cloud 106 are programmed and configured to deliver cloud computing services and/or microservices (not separately shown in FIG. 1). Unless otherwise indicated, the word "microservices" shall be interpreted as inclusive of larger "services" regardless of size. Cloud services are infrastructure, platforms, or software that are typically hosted by third-party providers and made available to users through the internet. Cloud services facilitate the flow of user data from front-end clients (for example, user-side servers, tablets, desktops, laptops), through the internet, to the provider's systems, and back. In some embodiments, cloud services may be configured and orchestrated according to as "as a service" technology paradigm where something is being presented to an internal or external customer in the form of a cloud computing service. As-a-Service offerings typically provide endpoints with which various customers interface. These endpoints are typically based on a set of application programming interfaces (APIs). One category of as-a-service offering is Platform as a Service (PaaS), where a service provider provisions, instantiates, runs, and manages a modular bundle of code that customers can use to instantiate a computing platform and one or more applications, without the complexity of building and maintaining the infrastructure typically associated with these things. Another category is Software as a Service (SaaS) where software is centrally hosted and allocated on a subscription basis. SaaS is also known as on-demand software, web-based software, or web-hosted software. Four technological sub-fields involved in cloud services are: deployment, integration, on demand, and virtual private networks.

As used herein, when used with reference to items, "a set of" means one or more of the items. For example, a set of clouds is one or more different types of cloud environments. Similarly, "a number of," when used with reference to items, means one or more of the items. Moreover, "a group of" or "a plurality of" when used with reference to items, means two or more of the items.

Further, the term "at least one of," when used with a list of items, means different combinations of one or more of the listed items may be used, and only one of each item in the list may be needed. In other words, "at least one of" means any combination of items and number of items may be used from the list, but not all of the items in the list are required. The item may be a particular object, a thing, or a category.

For example, without limitation, "at least one of item A, item B, or item C" may include item A, item A and item B, or item B. This example may also include item A, item B, and item C or item B and item C. Of course, any combinations of these items may be present. In some illustrative examples, "at least one of" may be, for example, without limitation, two of item A, one of item B, and ten of item C, or four of item B and seven of item C, or other suitable combinations.

In replication environments, there is one site designated as a production site (e.g., a cache site) and multiple receiving sites designated as target remote sites (e.g., disaster recovery or home sites). The production site captures all operations being performed by applications on local files of a filesystem at the production site and maintains a replication queue of operations in a first come, first served queue order. A gateway node maintains this replication queue in memory. The gateway node is one node in a cluster of host nodes at the production site. Each application running on a host node of the production site generates a remote procedure call when an application performs a local operation on a local file of the filesystem so that the remote procedure call updates the gateway node with the operation that the application performed on that local file.

In clustered filesystems where replication occurs from one clustered filesystem at one on-premises site to another cluster filesystem at another on-premises site or a cloud object storage for the purpose of backup and disaster recovery, this replication can happen over multiple remote sites. In addition, the replication can be over an open standard-based protocol such as network file system, simple storage service, or the like or the actual filesystem protocol used by the production and remote site when both the production site and the remote site use the same type of filesystem.

Most common filesystem protocols used by these remote sites are compatibility standards compliant and are supported by both local and remote filesystems. As a result, compatibility standards compliant operations performed by applications at the production site will be replicated to the filesystems of the remote sites through the underlying filesystem protocols, which the remote site filesystems are expected to have.

However, challenges exist in achieving multi-site replication. For example, how one target remote site is differentiated from another target remote site for replication purposes can be a challenge in multi-site replication. Existing replication solutions make certain bits, such as create, dirty, and set attribute bits, reserved on an inode to be binary in nature. In other words, the binary nature of these bits simply denotes whether an operation, such as create or write, has been replicated to a single remote site. For example, if a create bit is turned on in an inode, then replication of the create operation to the filesystem of the remote site has yet to be completed. When the replication of the create operation has been completed at the remote site, the remote site sends an acknowledgement to the gateway node to ensure that the create bit is then turned off.

However, if a create bit is turned on in an inode participating in multi-site replication, it may be unclear how the inode bits will behave. In other words, the replication state of an operation should be checked with respect to each particular remote site involved in the multi-site replication. For example, when an operation is successfully replicated to one target remote site and not to another target remote site, in accordance with the present disclosure, the system may identify that the other target remote site did not replicate the operation and, as a result, take corrective action such as automatically re-attempting replication and/or notifying an administrator of the error.

Existing replication solutions maintain a plurality of queues on the gateway node, one queue for each target remote site. A queue is a sequence of operations captured by the gateway node when applications perform live input/output operations on one or more files of the filesystem corresponding to the production site. The structure of a queue is simple for single remote site replication. For example, when an application performs a new operation on a file at the production site, the gateway node adds the operation to the queue corresponding to the target remote site. When the operation is replicated to the remote site and a replication completed acknowledgement is received, the gateway node dequeues the operation from that queue. Thus, this process is binary in nature for existing replication solutions.

However, existing replication solutions are not optimized for managing one queue for multi-site replication. In other words, existing replication solutions cannot handle utilizing one queue for successful replication of an operation to a plurality of target remote sites, delays in operation replication to one or more remote sites, or replication errors at one or more remote sites. Thus, acknowledgement of successful operation replication should be reflected on the inode bit in the filesystem of the production site. However, because multi-site replication is not binary in nature, a new replication solution is needed to accommodate operation replication to a plurality of target remote sites.

Further, states of a file set contained in the filesystem should be used so that a user (e.g., system administrator or the like) can understand whether the file set is complete for replication of all file operations. The gateway node stores in memory a replication-related data structure for the file set in the filesystem of the production site. The replication-related data structure includes the queue and various replication configuration settings (e.g., frequency of replication and the like) for the file set, along with identification of the plurality of target remote sites for replication of operations performed on the file set. Based on communication with a remote site, the gateway node reflects the operation replication state of the file set in the in-memory replication-related data structure based on which operations in the queue are either attempted to replicate or kept halted because the remote site is not yet ready for operation replication or is in an unexpected state.

Some replication solutions may generate multiple queue entries across multiple different queues that are maintained for replication to each of the plurality of target remote sites. For example, in case of replication to three different target remote sites, existing replication solutions maintain three separate queues and record each operation that happens on the production site on all three queues on the gateway node. As a result, existing replication solutions are inefficient in terms of resource utilization (e.g., storing too much data in-memory to get operation replication accomplished to all three target remote sites using three separate queues).

For production site filesystems that generate a lot of input/output operations, the multiple queues corresponding to the different target remote sites can fill up quickly and move to a cascaded problem state. For example, as the number of remote sites to replicate operations increases, and as the volume of input/output operations at the production site increases, the gateway node can be quickly overwhelmed in terms of number of operations to replicate causing cascaded effects to run multiple recoveries to get the remote sites back in synchronization. For example, the gateway node may fail due to the cascaded effects caused by the overwhelming number of operations to replicate and the queues containing the operations to be replicated to the multiple target remote sites are lost. As a result, a new replication solution is needed to track inode bits to detect when operations were previously missed for replication to one or more target remote sites, while those same operations were previously replicated to one or more other target remote sites.

Because existing replication solutions use just one queue per target remote site, the inode bits take a binary form. For example, an inode bit value of 1 denotes operation replication is pending at the corresponding target remote site, and an inode bit value of 0 denotes operation replication is completed. In contrast, illustrative embodiments utilize a plurality of different replication status inode bits which designate different states of file operation replication to respective target remote sites. Illustrative embodiments store the replication status inode bits on an inode of the filesystem in the production site for the gateway node to review and understand the status of replication of operations to respective target remote sites.

The plurality of replication status inode bits of illustrative embodiments include a create status inode bit, a dirty status inode bit, an append status inode bit, a set attribute status inode bit, a state status inode bit, a cached status inode bit, and a local status inode bit. Illustrative embodiments set the create status inode bit when an application running on a host node performs a create operation to generate a file on the filesystem of the production site, and the file needs replication to the plurality of target remote sites. Illustrative embodiments unset the create status inode bit when the file has been successfully replicated to each of the plurality of target remote sites.

Illustrative embodiments set the dirty status inode bit when an application performs an in-place data write operation on the file at the production site and the in-place data write operation on the file needs replication to the plurality of target remote sites. Illustrative embodiments unset the dirty status inode bit when the in-place data write operation on the file has been successfully replicated to each of the plurality of target remote sites.

Illustrative embodiments set the append status inode bit when an application performs a data write operation on the file at the production site beyond the last known offset on the file and the data write operation on the file beyond the last known offset on the file needs replication to the plurality of target remote sites. Illustrative embodiments unset the append status inode bit when the data write operation on the file beyond the last known offset on the file has been successfully replicated to each of the plurality of target remote sites.

Illustrative embodiments set the set attribute status inode bit when an application performs an attribute change operation on the file at the production site, and the attribute change operation on the file needs replication to the plurality of target remote sites. Illustrative embodiments unset the set attribute status inode bit when the attribute change operation on the file has been successfully replicated to each of the plurality of target remote sites.

Illustrative embodiments set the state status inode bit when an application perform a create file operation on the production site, and the created file operation needs replication to the plurality of target remote sites. This returns remote attributes of the file's counterpart at each of the plurality of target remote sites. When illustrative embodiments set the state status inode bit, it means that the file is available at each of the plurality of target remote sites and the local file on the production site has attributes regarding the local file's counterparts on the plurality of target remote sites. Illustrative embodiments unset the state status inode bit when the file is renamed, removed, or recreated at the plurality of target remote sites, and the file needs revalidation back into the filesystem of the production site. This is not applicable in remote site functionality because remote sites are passive and cannot take updates directly from applications running on the production site. In remote site functionality, illustrative embodiments do not set the state status inode bit when the file is initially created (e.g., when illustrative embodiments set the create status inode bit), but the same illustrative embodiments do set the state status inode bit when the file is replicated to each of the plurality of target remote sites. After the file is replicated to the plurality of target remote sites, illustrative embodiments typically do not unset this bit unless the file is renamed, removed, or recreated at a remote site.

Illustrative embodiments set the cached status inode bit when the file is available on the filesystem of the production site for replication. The cached status inode bit does not impact remote sites. Illustrative embodiments do not unset the cached status inode bit because applications perform all input/output operations on the production site only.

Illustrative embodiments set the local status inode bit when an application performs an update operation on the file, but the file update needs to remain local within the filesystem of the production site and does not need replication to the plurality of remote sites. This bit is only applicable for certain special directories on the production site that maintain local replication information for a few special modes of replication. Illustrative embodiments may not unset the local status inode bit.

Illustrative embodiments utilize the replication status inode bits to track which target remote sites a file operation has been replicated to and which target remote sites the file operation has not been replicated to. Because the plurality of target remote sites are sequenced 1 through N, illustrative embodiments define an order number to append to the replication status inode bits so that a simple AND operation with a replication status bit will indicate to illustrative embodiments whether a file operation represented by a particular replication status bit has been replicated to a particular target remote site or not.

Illustrative embodiments determine the order number to be appended to a replication status inode bit using 2 to the power of $(N-1)$, where N identifies a particular target remote site. For example, the order number appended to a replication status inode bit will be 1 for target remote site 1, 2 for target remote site 2, 4 for target remote site 3, 8 for target remote site 4, and so on until 2 to the power of $(N-1)$ for the last target remote site is reached.

This means that the replication status inode bits will have a variety of values. As an illustrative example scenario, the gateway node is replicating file operations performed on the production site to three different target remote sites (e.g., target remote site 1, target remote site 2, and target remote site 3). The replication status inode bit may have a value from 0 to 7 (e.g., 2 to the power of (3-1)). The meaning of each respective value from 0 to 7 is as follows.

A value of 0 means that the file operation represented by the replication status inode bit (e.g., a create replication status inode bit, a dirty replication status inode bit, a set attribute replication status inode bit, or the like) has been replicated to each respective target remote site of the plurality of target remote sites. A value of 1 means that the file operation represented by the replication status inode bit is pending replication to target remote site 1 and has completed to target remote site 2 and target remote site 3. A value of 2 means that the file operation represented by the replication status inode bit is pending replication to target remote site 2 and has completed to target remote site 1 and target remote site 3. A value of 3 means that the file operation represented by the replication status inode bit is pending replication to both target remote site 1 and target remote site 2, but has completed to target remote site 3. A value of 4 means that the file operation represented by the replication status inode bit is pending replication to target remote site 3 and has completed to target remote site 1 and target remote site 2. A value of 5 means that the file operation is pending replication to both target remote site 1 and target remote site 3, but has completed to target remote site 2. A value of 6 means that the file operation is pending replication to both target remote site 1 and target remote site 2, but has completed to target remote site 3. A value of 7 means that the file operation is pending replication to all three target remote sites (e.g., target remote site 1, target remote site 2, and target remote site 3).

In existing replication solutions, an inode bit occupies 1 bit on the inode. Together all seven replication status inode bit values of illustrative embodiments occupy seven bits to be stored on the inode because the seven bits are Boolean in nature. Because illustrative embodiments are only limited by the number of target remote sites that can be supported, a replication status inode bit value will either be an 8-bit integer limit value or a 16-bit integer limit value, both of which occupy four bits on the inode for each respective target remote site. Even a 32-bit integer limit value takes four bits on the inode; taking four bits on the inode causes all seven replication status inode bit values together to take up to 28 bits now as compared to seven bits previously in current replication solutions. In other words, illustrative embodiments take four times more inode space for the replication status inode bits. It should be noted that modern inodes are large enough to provide an extra 21 bits.

Illustrative embodiments do not determine the number of replication status inode bits needed at initialization time. However, illustrative embodiments need to dynamically provision the number of target remote sites supported. Illustrative embodiments maintain the number of replication status inode bits needed with respect to each particular target remote site of the plurality of target remote sites in the extended attribute bits of the inode where illustrative embodiments can dynamically add or remove the extended attribute bits as needed.

Illustrative embodiments utilize the replication-related data structure (e.g., replication handler) for the multi-site replication of input/output file operations. The replication-related data structure includes two separate data components, a fixed data component and a unique data component. The fixed data component includes all the replication configuration settings (e.g., frequency of replication and the like) related to the production site. These replication configuration settings will remain common to all target remote sites. Hence, illustrative embodiments just need one copy of the replication configuration settings in memory for the gateway node to perform replication of input/output file operations to the plurality of target remote sites.

The unique data component includes the replication queue of input/output file operations for replication and information regarding how to reach target remote sites (e.g., a map). The information on how to reach target remote sites may also include, for example, at least one of network protocol, internet protocol address, filesystem protocol, port number, remote export path name, mount path, bucket names, and the like for each respective target remote site. The queue contains the input/output file operations that need replication to the plurality of target remote sites. The gateway node stores the queue in memory so that when replication of a particular input/output file operation completes to the plurality of target remote sites, the gateway node can simply dequeue that input/output file operation from the queue.

Not all target remote sites will behave the same. For example, one target remote site may report a replication error whereas the replication of an input/output file operation to another particular target remote site may be delayed due to a greater geographic distance from the production site.

Furthermore, the replication-related data structure for the filesystem of the production site that replicates to the plurality of target remote sites may have a parent replication handler and a set of child replication handlers. The parent replication handler stores all the configuration settings of the production site for replication to all of the plurality of target remote sites that are involved. If even one configuration setting changes, the gateway node of illustrative embodiments applies the configuration setting change to all N number of target remote sites. Each child replication handler of the set of child replication handlers is dependent on the target remote site that that particular child replication handler replicates to. Each child replication handler stores only those file operations that need replication to its corresponding target remote site and only those replication configuration settings that apply to the target remote site that that particular child replication handler replicates to.

Thus, illustrative embodiments provide one or more technical solutions that overcome a technical problem with inefficient resource usage by existing replication solutions that need a plurality of queues to perform multi-site replication. As a result, these one or more technical solutions provide a technical effect and practical application in the field of multi-site replication.

With reference now to FIG. 2, a diagram illustrating an example of a multi-site replication management system is depicted in accordance with an illustrative embodiment. Multi-site replication management system 201 may be implemented in a computing environment, such as computing environment 100 in FIG. 1. Multi-site replication management system 201 is a system of hardware and software components for controlling multi-site replication by a gateway node of a single production site to a plurality of target remote sites utilizing a single replication queue for all the target remote sites.

In this example, multi-site replication management system 201 includes production site 202 and target remote sites 204. Production site 202 may be, for example, an on-premises production site that performs one or more production workloads using applications running on node cluster 206. In this example, node cluster 206 is comprised of host node 1 208, host node 2 210, and host node 3 212. Host node 1 208, host node 2 210, and host node 3 212 run the application workloads to perform one or more services. However, it should be noted that host node 1 208, host node 2 210, and host node 3 212 are intended as examples only and the node cluster 206 may include any number of host nodes.

Node cluster 206 also includes gateway node 214. Gateway node 214 monitors for and captures all input/output operations performed on files 216 of filesystem 218 by the applications running on host node 1 208, host node 2 210, and host node 3 212.

Filesystem 218 also includes inodes 220 and map 222. Inodes 220 store metadata for each of files 216 on filesystem 218. The metadata may contain, for example, file ownership, access mode (e.g., read, write, execute permissions, etc.), file type, locations of the files' data, and the like. Inodes also contain replication status inode bites 224. Replication status inode bites 224 represent a plurality of different inode bites that indicate a replication state of each respective target remote site of target remote sites 204 (e.g., whether replication is pending or not to each target remote site individually). Replication status inode bites 224 also indicate whether replication of an input/output operation on a particular file was a success or a failure to each respective target remote site. Map 222 identifies where replication is to be performed on target remote sites 204.

In this example, target remote sites 204 includes target remote site 1 226, target remote site 2 228, and target remote site 3 230. However, it should be noted that target remote sites 204 are intended as examples only and may include any number of target remote sites. Also, each respective target remote site may be located in a different cloud environment, a different on-premises location, or a combination thereof.

Target remote site 1 226 includes filesystem 1 232, target remote site 2 228 includes filesystem 2 234, and target remote site 3 230 includes filesystem 3 236. It should be noted that filesystem 218, filesystem 1 232, filesystem 2 234, and filesystem 3 230 may all be of the same filesystem type (e.g., compatibility standards compliant) or may comprise a combination of different filesystem types. At 238, gateway node 214 replicates the input/output file operations to each of filesystem 1 232, filesystem 2 234, and filesystem 3 230.

Figure 3:
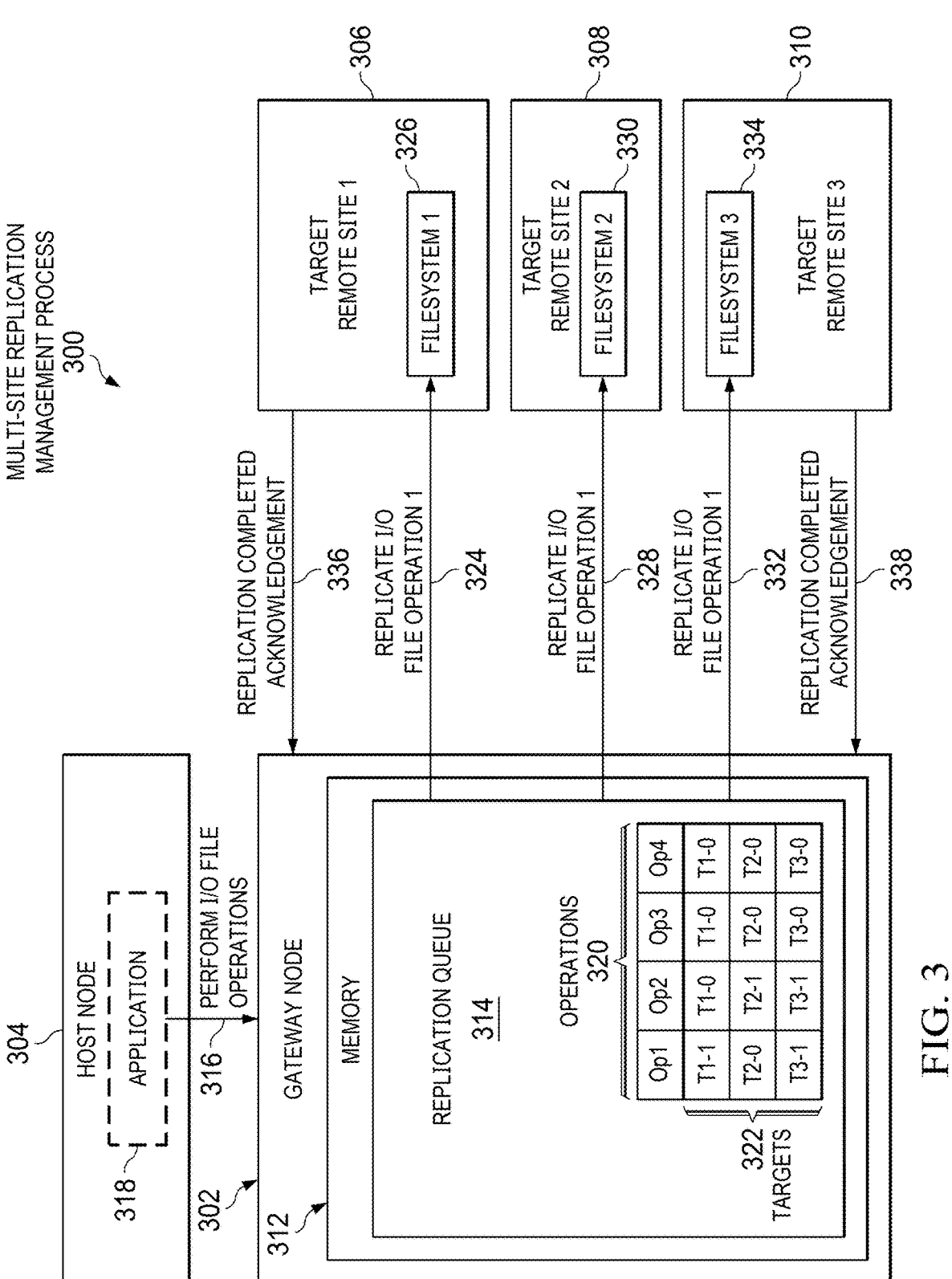
FIG. 3 is a diagram illustrating an example of a multi-site replication management process in accordance with an illustrative embodiment.

With reference now to FIG. 3, a diagram illustrating an example of a multi-site replication management process is depicted in accordance with an illustrative embodiment. Multi-site replication management process 300 is implemented in gateway node 302. Gateway node 302 may be, for example, computer 101 in FIG. 1 or gateway node 214 in FIG. 2. Further, multi-site replication management process 300 may be implemented by multi-site replication management code 200 in FIG. 1.

In this example, multi-site replication management process 300 includes host node 304, target remote site 1 306, target remote site 2 308, and target remote site 3 310. Host node 304 may be, for example, host node 1 208 in FIG. 2. Target remote site 1 306, target remote site 2 308, and target remote site 3 310 may be, for example, target remote site 1 226, target remote site 2 228, and target remote site 3 230 in FIG. 2. However, it should be noted that multi-site replication management process 300 is intended as an example only and not as a limitation on illustrative embodiments. For example, multi-site replication management process 300 may include any number of hosts nodes, target remote sites, and other devices and components not shown.

Gateway node 302 includes memory 312. Memory 312 may be, for example, RAM such as volatile memory 112 in FIG. 1. Memory 312 stores replication queue 314. Replication queue 314 represents a single queue for multi-site replication to target remote site 1 306, target remote site 2 308, and target remote site 3 310.

At 316 in this example, application 318 performs input/output file operations on a local filesystem corresponding to a production site, such as filesystem 218 that corresponds to production site 202 in FIG. 2. It should be noted that other applications running on other host nodes not shown may be performing input/output file operations on the local filesystem as well.

Gateway node 302 captures the input/output file operations and enqueues the captured input/output file operations in replication queue 314 under operations 320 as, for example, Op1, Op2, Op3, and Op4. Replication queue 314 also contains targets 322 such as, for example, T1, T2, and T3, which correspond to target remote site 1 306, target remote site 2 308, and target remote site 3 310, respectively. At 324, gateway node 302 replicates input/output file operation 1 (e.g., Op1) to filesystem 1 326 of target remote site 1 306. At 328, gateway node 302 replicates input/output file operation 1 to filesystem 3 330 of target remote site 2 308. At 332, gateway node 302 replicates input/output file operation 1 to filesystem 3 334 of target remote site 3 310. It should be noted that gateway node 302 may perform 324, 328, and 332 concurrently or substantially concurrently.

At 336, gateway node 302 receives a replication completed acknowledgement from target remote site 1 306. Similarly, at 338, gateway node 302 receives a replication completed acknowledgement from target remote site 3 310 as well. Gateway node 302 updates replication queue 314 to reflect the acknowledgements in targets 322 as, for example, T1-1 and T3-1, where 1 indicates replication has been completed. It should be noted that 0 indicates replication has not been completed, such as T2-0. Target remote site 2 308 may not have sent an acknowledgement due to, for example, replication error, delay caused by geographic distance, or the like.

Figure 4B:
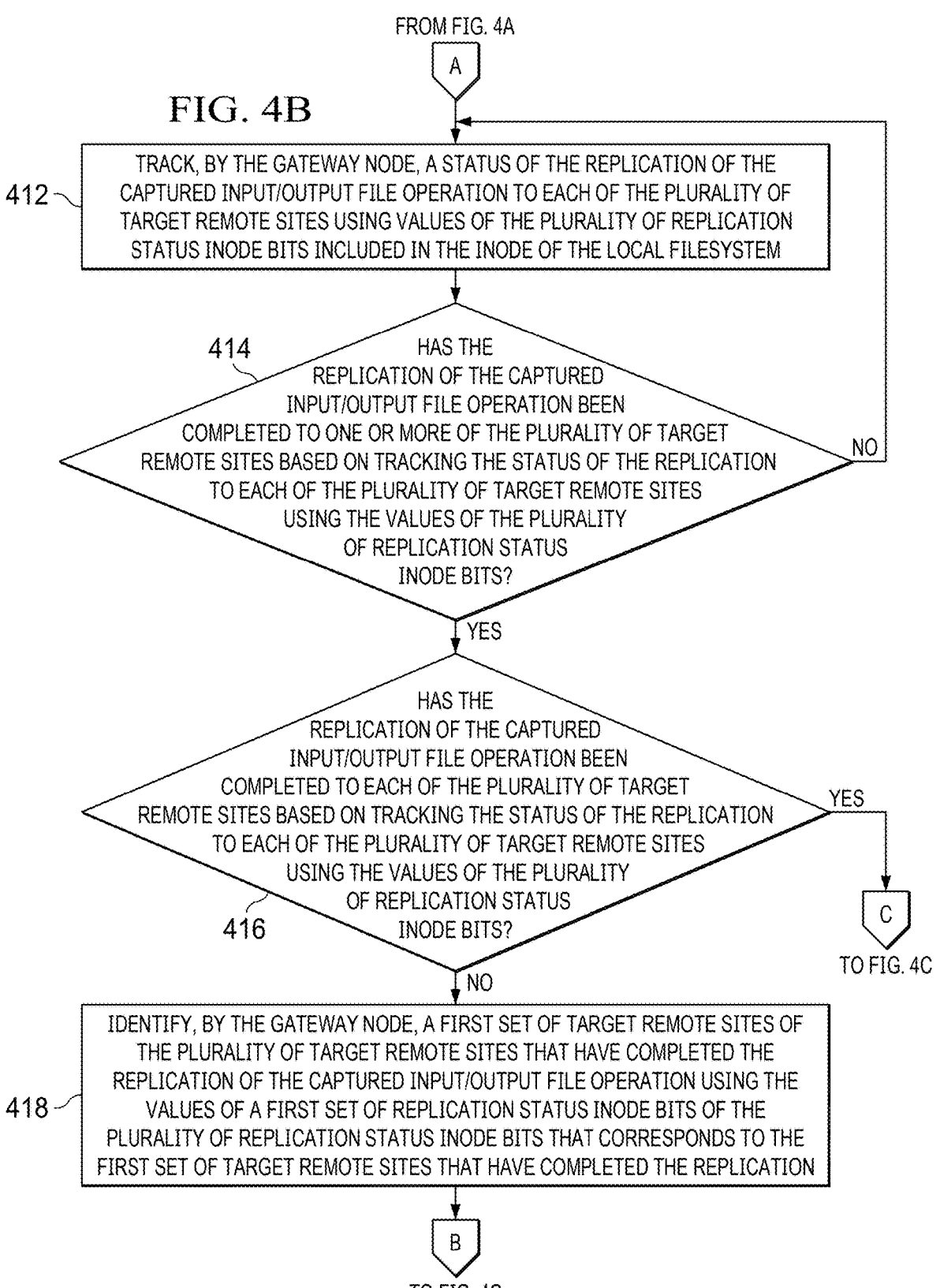

With reference now to FIGS. 4A-4C, a flowchart illustrating a process for managing multi-site replication is shown in accordance with an illustrative embodiment. The process shown in FIGS. 4A-4C may be implemented in a gateway node, such as, for example, computer 101 in FIG. 1, gateway node 214 in FIG. 2, or gateway node 302 in FIG. 3. For example, the process shown in FIGS. 4A-4C may be implemented by multi-site replication management code 200 in FIG. 1.

The process begins when the gateway node provisions a plurality of target remote sites for multi-site replication from a single production site to the plurality of target remote sites (operation 402). The single production site includes the gateway node and a plurality of host nodes. The plurality of target remote sites is located in a multi-cloud environment.

Subsequently, the gateway node receives an indication that an application running on a host node of the single production site is performing an input/output operation on a file of a local filesystem corresponding to the single production site via a remote procedure call (operation 404). The local filesystem includes an inode having a plurality of replication status inode bits for tracking replication of input/output operations to the plurality of target remote sites. A number of the plurality of replication status inode bits is based on a number of the plurality of target remote sites.

The gateway node captures the input/output operation on the file of the local filesystem to form a captured input/output file operation in response to receiving the indication that the application is performing the input/output operation on the file of the local filesystem (operation 406). The gateway node enqueues the captured input/output file operation on a single replication queue located in memory of the gateway node (operation 408). The single replication queue corresponds to each of the plurality of target remote sites.

Using a parent replication handler and a set of child replication handlers, the gateway node performs replication of the captured input/output file operation to each of the plurality of target remote sites based on the single replication queue and the plurality of replication status inode bits included in the inode of the local filesystem (operation 410). The gateway node tracks a status of the replication of the captured input/output file operation to each of the plurality of target remote sites using values of the plurality of replication status inode bits included in the inode of the local filesystem (operation 412).

The gateway node makes a determination as to whether the replication of the captured input/output file operation has been completed to one or more of the plurality of target remote sites based on tracking the status of the replication to each of the plurality of target remote sites using the values of the plurality of replication status inode bits (operation 414). If the gateway node determines that the replication of the captured input/output file operation has not been completed to one or more of the plurality of target remote sites based on tracking the status of the replication to each of the plurality of target remote sites using the values of the plurality of replication status inode bits, it results in a no output of operation 414. After the no output of operation 414, the process returns to operation 412 where the gateway node continues to track the status of the replication of the captured input/output file operation to each of the plurality of target remote sites.

If the gateway node determines that the replication of the captured input/output file operation has been completed to one or more of the plurality of target remote sites based on tracking the status of the replication to each of the plurality of target remote sites using the values of the plurality of replication status inode bits, it results in a yes output of operation 414. After the yes output of operation 414, the gateway node makes a determination as to whether the replication of the captured input/output file operation has been completed to each of the plurality of target remote sites based on tracking the status of the replication to each of the plurality of target remote sites using the values of the plurality of replication status inode bits (operation 416).

If the gateway node determines that the replication of the captured input/output file operation has been completed to each of the plurality of target remote sites based on tracking the status of the replication to each of the plurality of target remote sites using the values of the plurality of replication status inode bits, it results in a yes output of operation 416. After the yes output of operation 416, the process proceeds to operation 426. If the gateway node determines that the replication of the captured input/output file operation has not been completed to each of the plurality of target remote sites based on tracking the status of the replication to each of the plurality of target remote sites using the values of the plurality of replication status inode bits, it results in a no output of operation 416. After the no output of operation 416, the gateway node identifies a first set of target remote sites of the plurality of target remote sites that have completed the replication of the captured input/output file operation using the values of a first set of replication status inode bits of the plurality of replication status inode bits that corresponds to the first set of target remote sites that have completed the replication (operation 418).

Afterwards, the gateway node adjusts the values of the first set of replication status inode bits corresponding to the first set of target remote sites to indicate that the replication is completed to the first set of target remote sites (operation 420). In addition, the gateway node identifies a second set of target remote sites of the plurality of target remote sites that have not completed the replication of the captured input/output file operation using the values of a second set of replication status inode bits of the plurality of replication status inode bits that corresponds to the second set of target remote sites that have not completed the replication (operation 422).

Using the parent replication handler and the set of child replication handlers the gateway node continues the replication of the captured input/output file operation only to the second set of target remote sites of the plurality of target remote sites that have not completed the replication until the replication has been completed to each of the second set of target remote sites based on the values of the second set of replication status inode bits corresponding to the second set of target remote sites (operation 424). The gateway node removes the captured input/output file operation from the single replication queue corresponding to the plurality of target remote sites in response to the replication having been completed to each of the plurality of target remote sites (operation 426). Thereafter, the process terminates.

Thus, illustrative embodiments of the present disclosure provide a computer-implemented method, computer system, and computer program product for managing multi-site replication from a single production site to a plurality of target remote sites using a single replication queue. The descriptions of the various embodiments of the present disclosure have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A method comprising:
performing by an application running on a host node an input/output operation on a file of a local filesystem;
receiving by a gateway node via a remote procedure call an indication that the application running on the host node is performing the input/output operation on the file of the local filesystem;
capturing the input/output operation on the file of the local filesystem to form a captured input/output file operation in response to the gateway node receiving the indication that the application running on the host node is performing the input/output operation on the file of the local filesystem via the remote procedure call;
enqueuing the captured input/output file operation on a single replication queue located in memory that corresponds to a plurality of target remote sites; and
performing replication of the captured input/output file operation to each of the plurality of target remote sites concurrently based on the single replication queue and a plurality of replication status inode bits included in an inode of the local filesystem, the plurality of replication status inode bits includes a create status inode bit, a dirty status inode bit, an append status inode bit, a set attribute status inode bit, a state status inode bit, a cached status inode bit, and a local status inode bit.

2. The method of claim 1, further comprising:
tracking a status of the replication of the captured input/output file operation to each of the plurality of target remote sites using values of the plurality of replication status inode bits included in the inode of the local filesystem; and
determining whether the replication of the captured input/output file operation has been completed to one or more of the plurality of target remote sites based on tracking the status of the replication to each of the plurality of target remote sites using the values of the plurality of replication status inode bits.

3. The method of claim 2, further comprising:
responsive to determining that the replication of the captured input/output file operation has been completed to one or more of the plurality of target remote sites based on tracking the status of the replication to each of the plurality of target remote sites using the values of the plurality of replication status inode bits, determining whether the replication of the captured input/output file operation has been completed to each of the plurality of target remote sites based on tracking the status of the replication to each of the plurality of target remote sites using the values of the plurality of replication status inode bits; and responsive to determining that the replication of the captured input/output file operation has not been completed to each of the plurality of target remote sites, identifying a first set of target remote sites of the plurality of target remote sites that have completed the replication of the captured input/output file operation using the values of a first set of replication status inode bits of the plurality of replication status inode bits that corresponds to the first set of target remote sites that have completed the replication.

4. The method of claim 3, further comprising:

adjusting the values of the first set of replication status inode bits corresponding to the first set of target remote sites to indicate that the replication is completed to the first set of target remote sites.

5. The method of claim 3, further comprising:

identifying a second set of target remote sites of the plurality of target remote sites that have not completed the replication of the captured input/output file operation using the values of a second set of replication status inode bits of the plurality of replication status inode bits that corresponds to the second set of target remote sites that have not completed the replication; and continuing the replication of the captured input/output file operation only to the second set of target remote sites of the plurality of target remote sites that have not completed the replication until the replication has been completed to each of the second set of target remote sites based on the values of the second set of replication status inode bits corresponding to the second set of target remote sites.

6. The method of claim 1, further comprising:

removing the captured input/output file operation from the single replication queue corresponding to the plurality of target remote sites in response to the replication having been completed to each of the plurality of target remote sites.

7. The method of claim 1, further comprising:

provisioning the plurality of target remote sites for multi-site replication from a single production site to the plurality of target remote sites, the single production site includes the gateway node and a plurality of host nodes, the gateway node performs the replication of the captured input/output file operation to the plurality of target remote sites concurrently using the single replication queue, the plurality of target remote sites is located in a multi-cloud environment.

8. The method of claim 1, further comprising:

receiving the indication that the application running on the host node of a single production site is performing the input/output operation on the file of the local filesystem corresponding to the single production site by the gateway node via the remote procedure call, the local filesystem includes the inode having the plurality of replication status inode bits for tracking the replication of input/output operations to the plurality of target remote sites, a number of the plurality of replication status inode bits is based on a number of the plurality of target remote sites.

9. A computer system comprising:

a processor set;

one or more computer-readable storage media; and program instructions stored on the one or more computer-readable storage media to cause the processor set to perform operations comprising:

performing by an application running on a host node an input/output operation on a file of a local filesystem;

receiving by a gateway node via a remote procedure call an indication that the application running on the host node is performing the input/output operation on the file of the local filesystem;

capturing the input/output operation on the file of the local filesystem to form a captured input/output file operation in response to the gateway node receiving the indication that the application running on the host node is performing the input/output operation on the file of the local filesystem via the remote procedure call;

enqueuing the captured input/output file operation on a single replication queue located in memory that corresponds to a plurality of target remote sites; and performing replication of the captured input/output file operation to each of the plurality of target remote sites concurrently based on the single replication queue and a plurality of replication status inode bits included in an inode of the local filesystem, the plurality of replication status inode bits includes a create status inode bit, a dirty status inode bit, an append status inode bit, a set attribute status inode bit, a state status inode bit, a cached status inode bit, and a local status inode bit.

10. The computer system of claim 9, wherein the operations further comprise:

tracking a status of the replication of the captured input/output file operation to each of the plurality of target remote sites using values of the plurality of replication status inode bits included in the inode of the local filesystem; and determining whether the replication of the captured input/output file operation has been completed to one or more of the plurality of target remote sites based on tracking the status of the replication to each of the plurality of target remote sites using the values of the plurality of replication status inode bits.

11. The computer system of claim 10, wherein the operations further comprise:

responsive to determining that the replication of the captured input/output file operation has been completed to one or more of the plurality of target remote sites based on tracking the status of the replication to each of the plurality of target remote sites using the values of the plurality of replication status inode bits, determining whether the replication of the captured input/output file operation has been completed to each of the plurality of target remote sites based on tracking the status of the replication to each of the plurality of target remote sites using the values of the plurality of replication status inode bits; and responsive to determining that the replication of the captured input/output file operation has not been completed to each of the plurality of target remote sites, identifying a first set of target remote sites of the plurality of target remote sites that have completed the replication of the captured input/output file operation using the values of a first set of replication status inode bits of the plurality of replication status inode bits that corresponds to the first set of target remote sites that have completed the replication.

12. The computer system of claim 11, wherein the operations further comprise:

adjusting the values of the first set of replication status inode bits corresponding to the first set of target remote sites to indicate that the replication is completed to the first set of target remote sites.

13. The computer system of claim 11, wherein the operations further comprise:

identifying a second set of target remote sites of the plurality of target remote sites that have not completed the replication of the captured input/output file operation using the values of a second set of replication status inode bits of the plurality of replication status inode bits that corresponds to the second set of target remote sites that have not completed the replication; and continuing the replication of the captured input/output file operation only to the second set of target remote sites of the plurality of target remote sites that have not completed the replication until the replication has been completed to each of the second set of target remote sites based on the values of the second set of replication status inode bits corresponding to the second set of target remote sites.

14. A computer program product comprising:

one or more computer-readable storage media; and program instructions stored on the one or more computer-readable storage media to perform operations comprising:

performing by an application running on a host node an input/output operation on a file of a local filesystem;

receiving by a gateway node via a remote procedure call an indication that the application running on the host node is performing the input/output operation on the file of the local filesystem;

capturing the input/output operation on the file of the local filesystem to form a captured input/output file operation in response to the gateway node receiving the indication that the application running on the host node is performing the input/output operation on the file of the local filesystem via the remote procedure call;

enqueuing the captured input/output file operation on a single replication queue located in memory that corresponds to a plurality of target remote sites; and performing replication of the captured input/output file operation to each of the plurality of target remote sites concurrently based on the single replication queue and a plurality of replication status inode bits included in an inode of the local filesystem, the plurality of replication status inode bits includes a create status inode bit, a dirty status inode bit, an append status inode bit, a set attribute status inode bit, a state status inode bit, a cached status inode bit, and a local status inode bit.

15. The computer program product of claim 14, wherein the operations further comprise:

tracking a status of the replication of the captured input/output file operation to each of the plurality of target remote sites using values of the plurality of replication status inode bits included in the inode of the local filesystem; and determining whether the replication of the captured input/output file operation has been completed to one or more of the plurality of target remote sites based on tracking the status of the replication to each of the plurality of target remote sites using the values of the plurality of replication status inode bits.

16. The computer program product of claim 15, wherein the operations further comprise:

responsive to determining that the replication of the captured input/output file operation has been completed to one or more of the plurality of target remote sites based on tracking the status of the replication to each of the plurality of target remote sites using the values of the plurality of replication status inode bits, determining whether the replication of the captured input/output file operation has been completed to each of the plurality of target remote sites based on tracking the status of the replication to each of the plurality of target remote sites using the values of the plurality of replication status inode bits; and responsive to determining that the replication of the captured input/output file operation has not been completed to each of the plurality of target remote sites, identifying a first set of target remote sites of the plurality of target remote sites that have completed the replication of the captured input/output file operation using the values of a first set of replication status inode bits of the plurality of replication status inode bits that corresponds to the first set of target remote sites that have completed the replication.

17. The computer program product of claim 16, wherein the operations further comprise:

adjusting the values of the first set of replication status inode bits corresponding to the first set of target remote sites to indicate that the replication is completed to the first set of target remote sites.

18. The computer program product of claim 16, wherein the operations further comprise:

identifying a second set of target remote sites of the plurality of target remote sites that have not completed the replication of the captured input/output file operation using the values of a second set of replication status inode bits of the plurality of replication status inode bits that corresponds to the second set of target remote sites that have not completed the replication; and continuing the replication of the captured input/output file operation only to the second set of target remote sites of the plurality of target remote sites that have not completed the replication until the replication has been completed to each of the second set of target remote sites based on the values of the second set of replication status inode bits corresponding to the second set of target remote sites.

19. The computer program product of claim 14, wherein the operations further comprise:

removing the captured input/output file operation from the single replication queue corresponding to the plurality of target remote sites in response to the replication having been completed to each of the plurality of target remote sites.

20. The computer program product of claim 14, wherein the operations further comprise:

provisioning the plurality of target remote sites for multi-site replication from a single production site to the plurality of target remote sites, the single production site includes the gateway node and a plurality of host nodes, the gateway node performs the replication of the captured input/output file operation to the plurality of target remote sites concurrently using the single replication queue, the plurality of target remote sites is located in a multi-cloud environment.

* * * * *